United States Patent
Lauper et al.

(10) Patent No.: US 7,095,522 B2
(45) Date of Patent: Aug. 22, 2006

(54) METHOD FOR THE TRANSMISSION OF IMAGE DATA

(75) Inventors: Eric Lauper, Bern (CH); Rudolf Ritter, Zollikofen (CH)

(73) Assignee: Swisscom Mobile AG, Bern (CH)

( * ) Notice: Subject to any disclaimer, the term of this patent is extended or adjusted under 35 U.S.C. 154(b) by 483 days.

(21) Appl. No.: 10/082,837

(22) Filed: Feb. 25, 2002

(65) Prior Publication Data

US 2002/0101612 A1   Aug. 1, 2002

Related U.S. Application Data

(63) Continuation of application No. PCT/CH99/00632, filed on Dec. 30, 1999.

(51) Int. Cl.
*G06F 15/00* (2006.01)

(52) U.S. Cl. ............................ 358/1.15; 348/15; 348/16

(58) Field of Classification Search ................ 358/1.1, 358/1.5, 1.12, 1.15; 348/15, 16, 17; 382/232, 382/236, 240, 248
See application file for complete search history.

(56) References Cited

U.S. PATENT DOCUMENTS

| | | | |
|---|---|---|---|
| 4,513,317 A * | 4/1985 | Ruoff, Jr. ............... 375/240.25 |
| 5,055,927 A * | 10/1991 | Keesen et al. ........... 348/389.1 |
| 5,103,306 A | 4/1992 | Weiman et al. | |
| 5,326,266 A * | 7/1994 | Fisher et al. ................... 434/44 |
| 5,668,622 A * | 9/1997 | Charbonnier et al. ....... 351/209 |
| 5,898,423 A * | 4/1999 | Tognazzini et al. ......... 345/158 |
| 5,980,044 A * | 11/1999 | Cannon et al. ............... 353/30 |
| 6,078,349 A * | 6/2000 | Molloy .................... 348/14.07 |
| 6,094,182 A * | 7/2000 | Maguire, Jr. .................. 345/9 |
| 6,252,989 B1 * | 6/2001 | Geisler et al. ............. 382/232 |
| 6,312,129 B1 * | 11/2001 | Sisodia et al. ................ 353/31 |
| 6,433,759 B1 * | 8/2002 | Richardson et al. ........... 345/7 |
| 6,454,411 B1 * | 9/2002 | Trumbull .................... 351/211 |

FOREIGN PATENT DOCUMENTS

| WO | WO 97/30551 | 8/1997 |
| WO | WO 99/52613 | 10/1999 |

OTHER PUBLICATIONS

Reeves, T. H. et al, "Adaptive Foveation of MPEG Video", Proceedings of ACM Multimedia, US, New York, ACM, Nov. 18, 1999, pp. 231-241. XP-000734723.

Khansari, M. et al, "Low Bit-Rate Video Transmission Over Fading Channels For Wireless Microcellular Systems", IEEE Transactions on Circuits and Systems for Video Technology, US, IEEE Inc., New York, vol. 6, No. 1, Feb. 1, 1996, pp. 1-11. XP-000625574.

* cited by examiner

*Primary Examiner*—Mark Wallerson
(74) *Attorney, Agent, or Firm*—Pearne & Gordon LLP

(57) ABSTRACT

Method for the transmission and reproduction of image data in which image data are transmitted to a communication terminal and reproduced the current viewing direction of the communication terminal's user being determined. First image data are transmitted with a low resolution over a first transmission channel, for example a DVB, whilst second image data corresponding to the image areas viewed currently or in future by the user are transmitted with a higher resolution over a second transmission channel.

The first and second image data are superimposed and simultaneously reproduced in the communication terminal.

61 Claims, 3 Drawing Sheets

METHOD FOR THE TRANSMISSION OF IMAGE DATA

This application is a continuation of PCT/CH99/00632 filed Dec. 30, 1999.

FIELD OF THE INVENTION

The present invention concerns a method for the transmission of image data as well as devices suitable therefor.

RELATED ART

Image data, in particular digital data that can be represented as images to a user with suitable reproduction means, are often compressed before transmission in order to reduce the transmission times and then decompressed before or during reproduction. Different standards for the compression and decompression of image data, for example the different MPEG (Moving Pictures Expert Group) standards, have already been described.

Patent application WO98/33315 (University of Texas) describes another image data compression method that is based on the physiological characteristics of the human eye, which needs a maximal resolution only in the area of the image projected onto the eye's fovea (viewing area). Marginal image areas can be reproduced with a lower resolution without noticeable loss of quality. This patent application thus proposes to continuously determine the image area viewed by the user and to use the maximal resolution only for this image area, whilst a lower resolution is used for further removed areas. The viewed image area typically constitutes about two percent of the entire image. The image strongly compressed in this manner is then transmitted over a transmission channel between two computers.

This method is suitable in particular for the transmission of images that are destined to being reproduced on a small display, for example on the screen of an office computer. When the viewing point is able to move quickly, for example with very wide image formats or when the pupil moves jerkily, it can happen that the reaction time of the system is too slow, so that image areas with a poor resolution can suddenly appear at the center of the viewed area. Furthermore, this method is not suitable for the simultaneous sending of image data to a plurality of users.

It is an aim of the present invention to propose a new and improved method for the compression and transmission of images, in particular a method with which the aforementioned disadvantages can be avoided.

BRIEF SUMMARY OF THE INVENTION

According to the present invention, this aim is achieved in particular through the elements of the independent claims. Further advantageous embodiments are moreover described in the dependent claims and in the description.

In particular, these aims of the invention are achieved with a method for the transmission and reproduction of image data in which said image data can be transmitted by a sending device to at least one communication terminal and reproduced by image reproducing means in said at least one communication terminal, the current viewing direction of the communication terminal's user being determined, first image data corresponding to the entire image area are transmitted with a low resolution over a first transmission channel, said current viewing direction being sent to said sending device over a reverse channel, second image data corresponding to the image area currently viewed by the user are transmitted with a higher resolution over a second transmission channel, and said first and second image data are superimposed and simultaneously reproduced.

This has the advantage that the first image data are transmitted over a first transmission channel (for example a broadcast channel), whilst only the second image data, corresponding to the currently viewed image area, are transmitted over a second transmission channel (for example a costly bi-directional mobile radio network). Thus, a higher resolution than that in the aforementioned patent application WO98/33315 can be used for the marginal areas, without the data quantity transmitted over the payable mobile radio network being increased.

Through the broadcast channel, the same image data can be sent with a low resolution to all users, whilst image data corresponding to the image area viewed by the individual users can be sent personally with a higher resolution to every user over the second transmission channel.

DESCRIPTION OF THE DRAWINGS

Hereafter, an embodiment of the present invention will be described by means of an example. The example of the embodiment will be illustrated by the following attached drawings, in which.

DETAILED DESCRIPTION OF THE INVENTION

Figure 1:
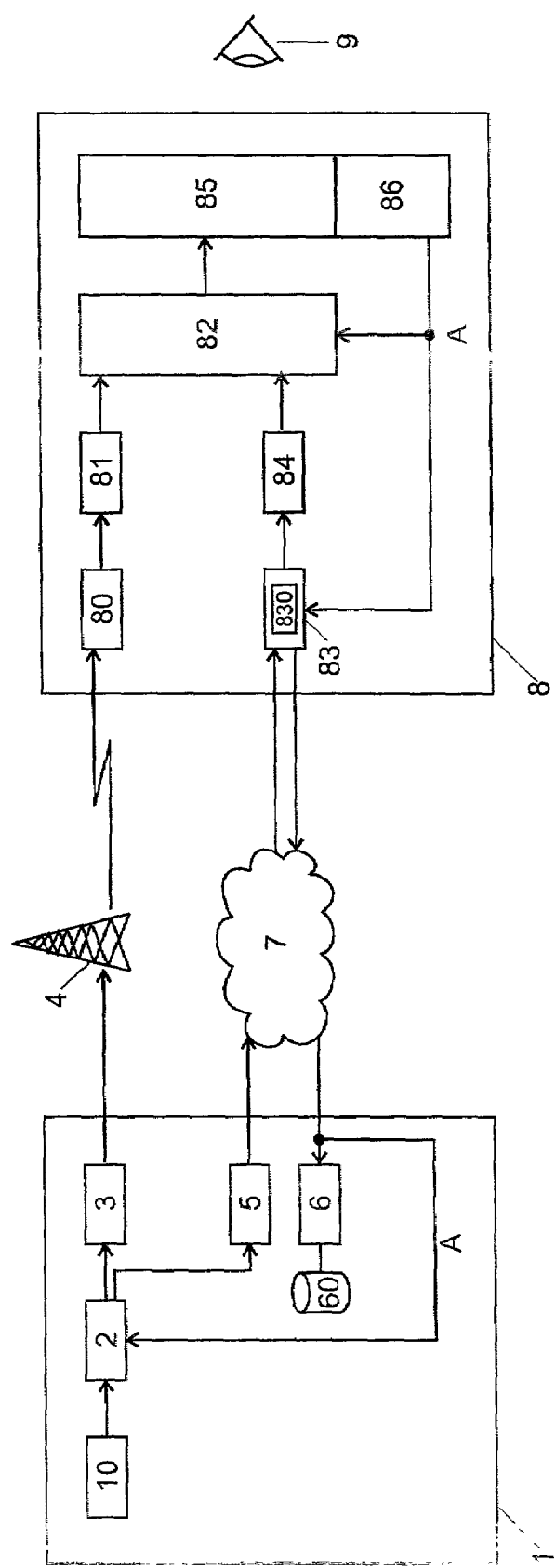
FIG. 1 shows a block diagram of the system according to the invention.

In FIG. 1, the reference number 1 refers to a sending device that can consist for example of a commercially available communication server having hardware and software components for communicating over two different transmission channels 4, 7 with a plurality of communication terminals 8. The reference number 10 refers to image data, for example digital data files, whose contents can be represented with suitable reproduction means to a user 9 as images, for example as motionless or preferably animated images. The image data can for example correspond to a digitized image sequence (for example a movie or a television program) or other multimedia data, for example HTML data containing fixed and/or animated image data and/or sound data. In a variant embodiment of the invention, the image data 10 in the particularly interesting image area and image details onto which the viewer will with a high probability direct his eye, are specially marked, as will be explained further below.

The sequence of image data is read sequentially through a sequencer (not represented) in the sending device 1, the sequence being optionally controlled by the user 9, for example in the case of image data with hypertext control elements. The sequencer can for example consist of a hardware and/or software module that reads the images of the image sequence and forwards them to an (optional) segmentation module 2.

Figure 2:
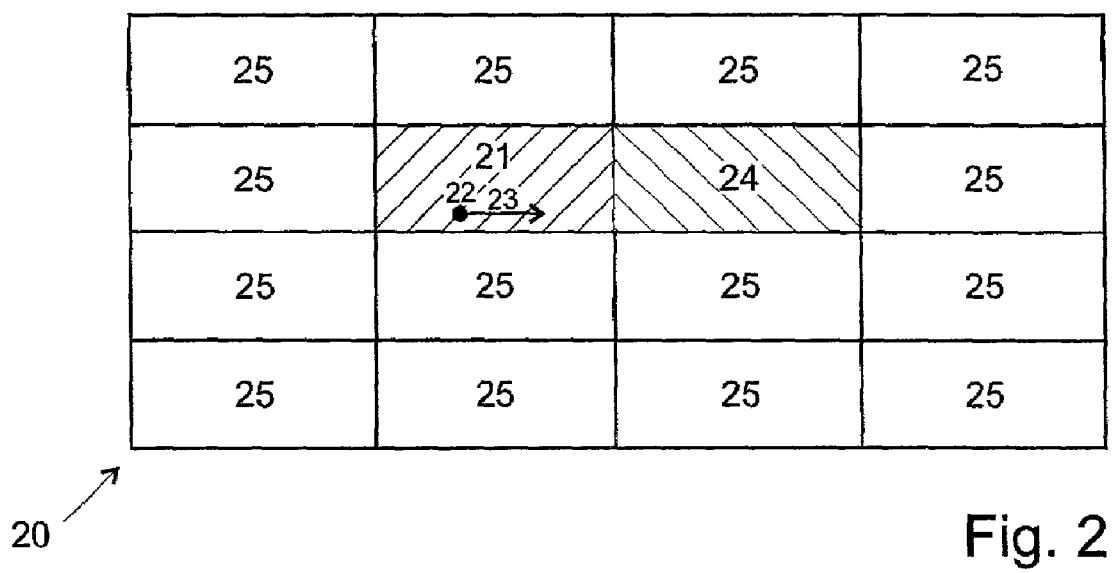
FIG. 2 shows diagrammatically the segmentation of the bitmap.
Figure 3:
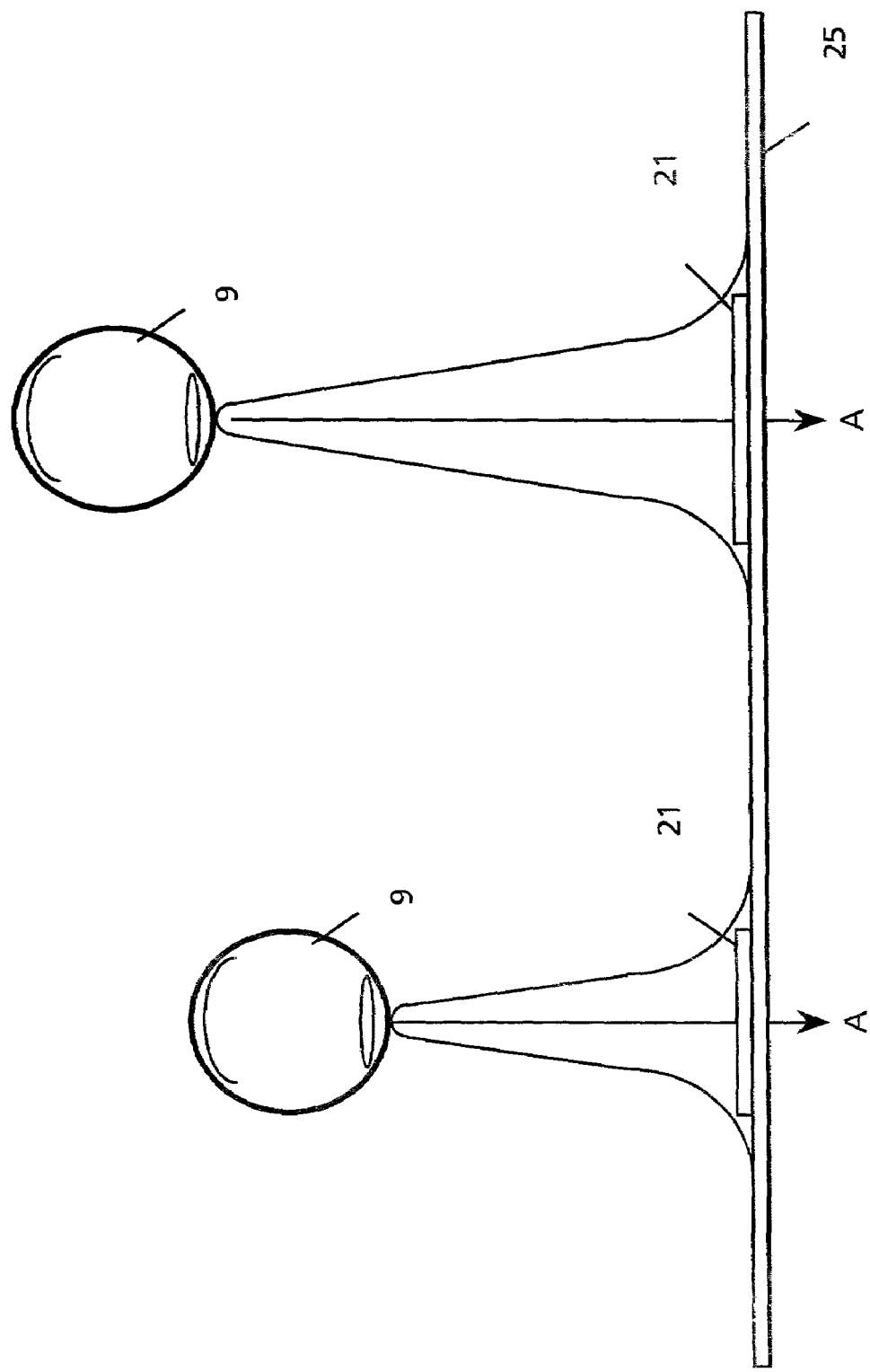
FIG. 3 shows the resolution requirement determined by the eye's physiology when image data is viewed by several users.

The segmentation module 2 partitions the image in different segments, as represented in FIG. 2. For this, it uses indications A about the current viewing direction of the individual user 9, for example the coordinates x, y of all points 22 onto which the eye direction of at least one user 9 is currently directed. Preferably, one or several displacement vectors 23 corresponding to the speed of the currently viewed points 22, are additionally received or determined in the segmentation module.

The segmentation module 2 determines on the basis of these indications A the area or areas 21 that are currently viewed by at least one user 9. As will be described further below, these areas are compressed with a higher resolution and transmitted to the corresponding user over the transmission channel 7. The entire image, including the marginal areas 25, is compressed with a lower resolution with another algorithm and sent to all users over the transmission channel 4. The size of each area 21 can preferably be adapted to the bandwidth of the transmission channel 7. Typically, the size of each high resolution area 21 corresponds to about 2 to 4 percent of the entire image.

In a preferred embodiment, the segmentation module 2 furthermore tries to determine in advance one or several viewing areas 24. To this effect, the segmentation module can for example take into account the eye movements indicated with the displacement vector 23, the movement of the viewed object or of the person on the image and/or specially marked details in the image data, for example hyperlinks in the case of multimedia image data. The segmentation module 2 can for example store successive positions of the eyes and/or of the viewed object on the image and determine in advance the next expected viewing direction, for example by means of suitable regression functions, it being possible to mark manually certain often viewed areas.

In the variant embodiment represented in FIG. 2, the different image areas 21, 24, 25 are rectangular. They can however also have another shape and different sizes and overlap partially or totally.

The image areas 25 removed from the viewing point are sent to a first encoding module 3 where they are compressed for example with a MPEG algorithm or, in the case of motionless images, with a JPEG or GIF algorithm. The first encoding module 3 uses preferably spatial, temporal and chrominance compression methods. Furthermore, the first encoding module preferably conducts an error encoding and a channel encoding.

The image areas encoded by the encoding module 3 are then sent from a sender 4 in broadcast mode and can thus be received by a plurality of receivers 8 by means of individual broadcast receivers 80. The sender 4 can for example send the data as DAB (Digital Audio Broadcasting) or DVB (Digital Video Broadcasting) image data, as television data, for example digitally encoded television data, or as TCP-IP data over the Internet, etc. The data prepared by the encoding module 3 can even be copied on magnetic and/or optical data carriers, for example on CD or on DVD, and in this manner can be distributed commercially and purchased by a plurality of users.

The image data received by the first receiver 80 in the communication terminal 8 are copied in a first cache memory 81, image areas 25 from several successive individual images being preferably stored. In this manner, variable transmission times can be compensated through the two transmission channels 4 and 7.

The data selected by the segmentation module from the image areas 21 and 24 viewed currently and in future are forwarded to a second encoding module 5 that compresses each area 21, 24 viewed currently and in future with a foveal compression function, i.e. with a function that supplies as a result image data with a higher resolution at close range to the viewed point 22 than in the further removed image areas, as this is described in the aforementioned patent application WO98/33315. In a preferred embodiment of the invention, at least certain parameters of the foveal function can be dependent on the bandwidth of the second transmission channel. Furthermore, the second encoding module 5 preferably conducts an error encoding and a channel encoding.

Each image area 21 encoded by the second encoding module 5 is sent over a second transmission channel 7 to all users 9 who are currently viewing this image area and can thus be received by these users by means of second receivers 83 (for example mobile radio terminals) in the communication terminals 8. The second transmission channel 7 is a bi-directional communication channel that allows near real-time connections, for example a publicly connected telephone network, for example a digital mobile radio network, for example according to GSM or UMTS, or a fixed-line network, for example according to ISDN, or a TCP-IP network, for example Internet.

A variant embodiment of the invention (not represented) forgoes the segmentation module 2 and all the individual images 10 are forwarded to the two encoding modules 3 and 5. The first encoding module 3 can consist in this case of a standardized module that compresses all areas 21, 24 and 25 of all individual images. The second encoding module 5 can compress all the images according to a foveal function.

The communication terminals 8 are preferably personally portable, electrically autonomous and are preferably made as pocket devices. In the embodiment in which the telecommunication network 7 is a mobile radio network, at least certain of the communication terminals 8 are mobile radio devices, for example mobile radio telephones or communication-capable laptops or palmtop computers that comprise also a broadcast receiver 80. Such combined communication terminals have already been described for example in patent applications WO99/60712 and WO99/60713 (both in the name of Swisscom AG). The mobile radio device 83 can for example exchange data over the mobile radio network 7 with the aid of GPRS (Generalized Packet Radio Service), or according to a suitable protocol in the service channel. The first receiver, for example a DVB receiver, and the second receiver 83, for example a UMTS terminal, are preferably combined in a single unit (for example in a single housing), but can in variant embodiments be integrated in several units combined with one another. In the latter case, the two units are preferably connected over a contactless interface, for example according to RrdA, Bluetooth or HomeRF.

The image data received by the second receiver 83 in the communication terminal 8 are copied in a second cache memory 84, several successive image areas 21 resp. 24 being preferably stored in the second cache memory 84.

A superimposition module 82 in the communication terminal 8 reads the image data in both cache memories 81 and 84 and crossfades them. To this effect, each image area 21, 24, 25 in both cache memories preferably carries a number indicating to which individual image it belongs, in order to compensate different transmission times through the two transmission channels 4 and 7. The image area 21, 24 selected by the module 82 in the second cache memory 84 is selected according to the currently viewed image area. If the cache memory is large enough, it can also be used to pause, restart and/or wind forwards and backwards the reading of the stored image data through appropriate user commands.

The image signals corresponding to the image data combined by the module 82 can then be reproduced through a display device 85 of the communication terminal 8. In a preferred embodiment of the invention, the display device consists of a so-called Virtual Retina Display (VRD), that projects the image signals onto the retina of the eye of the user 9 of the communication terminal 8. Such VRD devices have been described in patent applications WO 94/09472 and WO 97/37339. The display device 85 can be supplied with image data in different formats over a suitable interface.

The display device 85 and the further components of the communication terminal 8 can be implemented in common or separate units, it being possible to connect the display device 85 in a first unit with components of the second unit for example over a wire-bound or over a wireless interface.

As represented diagrammatically in FIG. 1, the communication terminal 8 comprises a viewing direction measuring module 86 that can determine the viewing direction x, y of the user 9. Such a viewing-direction measuring-module (Eye Tracking System ETS) has also been described in the aforementioned patent application WO 94/09472. The indication A of the viewing direction x, y is forwarded to the module 82 which can, as has already been mentioned, determine which image area 21, 24 from the second cache memory 84 is to be read. Thereafter, this indication A is forwarded to the transceiver 83, linked through a module (not represented) with user-specific indications and forwarded in real-time from the transceiver 83 over the reverse channel of the second transmission channel 7 to the sending device 1. According to the type of the second transmission channel, these indications A can be transmitted for example as USSD message or preferably over the service or data channel.

In one embodiment, the viewing direction is preferably measured by means of a measuring module mounted on spectacles opposite the user's head and measuring preferably the position of the pupil of at least one eye.

In another embodiment, the viewing direction is preferably measured by means of a measuring module mounted on spectacles opposite the user's head and measuring the position and/or orientation of the head of the user 9 in comparison with a reference world by means of a measuring system, preferably an inertial system mounted on the user's head. Thus, image data that are larger than the user's field of vision and the contents of which can move when the user turns his head can be projected to the user 9. In this way, the current viewing direction 22 can be linked with the valid viewed area 21. With this method, films with very large angle views can be represented to a user.

Said additional user-specific indications that are sent back similarly to the viewing direction A, preferably comprise a user identification stored for example in a personal identification module 830 (for example a SIM card). Furthermore, these additional indications can include other commands from the user 9 (for example a URL selected by the user in the case where the represented image contains hyperlinks) or other selections in menus. These additional indications can be transmitted together or separately. At least certain additional indications can be encrypted and/or signed electronically.

In the sending device 1, the received indication A of the currently viewed point x, y is used by the segmentation module 2 to determine the currently viewed image area 21 and, if necessary, to predetermine the future image area 24 and to forward these image areas 21, 24 to the encoding module 5.

The user identification transmitted as additional indication can be used by a billing center 6 on the sender's side that can bill the viewing of the image data. The billed amount can for example be debited directly from a prepaid money amount stored on the identification module 830, from a bank account from a credit card or through an invoice (for example as part of the telephone bill) and can be billed for example per time unit of the received image data, per title, per additional information or pages and/or in combination with a subscription. User-specific settings for the invoice (for example the preferred billing address and type of invoice) can be stored in the billing center in a user data bank 80. The billing center can be integrated in the sending device 1 or, in a variant embodiment, can be administered by another institute (for example by the operator of the network 7).

Selection commands and instructions that are entered by the user 9 of the telecommunication terminal 8 and transmitted as additional indications over the second transmission channel 7 are received and processed further by said sequencer (not represented), so that for example image data requested by the user, for example subtitles, HTML or WML pages, sound sequences etc. can be obtained and transmitted over both transmission channels to the communication terminal 4.

This invention is particularly suited for the simultaneous transmission of image data 1 (for example movies or television programs) to a plurality of users 9, common data being sent over a broadcast channel 4 whilst data that are dependent on the personal viewing direction are transmitted over an addressed channel 7. It can however also be used for video conferences or for telephone calls with image transmission between two partners. In this way, the transmission of the image data, whilst taking into account the resolution requirements determined by the eye's physiology, is tailored to the predetermined, maximal bandwidth of the communication channels 4 and 7.

Although several details of this invention's description relate to the special case of an embodiment in a GSM mobile radio network, the one skilled in the art will understand that this method can also be used with other types of mobile and fixed-line networks, for example with AMPS, TDMA, CDMA, TACS, PDC, HSCSD, GPRS, EDGE or UMTS mobile radio networks, in particular with WAP (Wireless Application Protocol)-capable mobile radio networks. This invention can furthermore be used in other networks, in particular the Internet.

The invention claimed is:

1. A method for the transmission and reproduction of image data, in which said image data are transmitted from a sending device to a plurality of communication terminals and reproduced by image reproducing means, the current viewing direction of the communication terminal's user being determined, said method comprising the steps of:

broadcasting first image data with a lower resolution over a first transmission channel to a plurality of users each using one of said communication terminals, sending said current viewing direction of one of the users over a reverse channel to said sending device, transmitting, specifically to the one of the users, second image data corresponding to the image areas viewed currently, or in future, by said one of the users, said transmitting second image data being transmitted with a higher resolution over a second transmission channel, and superimposing and simultaneously reproducing said first and second image data in the communication terminal used by the one of the users.

2. A method for the transmission of image data from a sending device to a communication terminal, comprising the steps of:

broadcasting first image data over a first transmission channel to a plurality of communication terminals;

retrieving a user viewing direction of a specific user of one of said communication terminals; and transmitting second image data over a second transmission channel to the communication terminal of the specific user, said second image data having a higher resolution than said first image data, wherein said specific user viewing direction is utilized such that said second image data corresponds to a viewed image area currently being viewed by the user or predicted of being viewed by the user in the future.

3. The method of claim 2, wherein said image data are projected by said image reproducing means onto the retina of said user.

4. The method of claim 3, wherein said viewed image area is the image area that is to be projected onto the fovea of said retina.

5. The method of claim 2, wherein the size of said viewed image area can be adjusted.

6. The method of claim 2, wherein the size of said viewed image area can be adapted to the bandwidth of said second transmission channel.

7. The method of claim 2, wherein said first image data are transmitted in broadcast mode over said first transmission channel.

8. The method of claim 7, wherein said first image data are transmitted as DVB data.

9. The method of claim 2, wherein said first image data are copied and commercially distributed on magnetic and/or optical data carriers.

10. The method of claim 2, wherein sound data are transmitted over the first transmission channel simultaneously with said first image data and reproduced by said communication terminal.

11. The method of claim 2, wherein said second transmission channel is bi-directional and wherein said reverse channel is the reverse channel of this said bi-directional second transmission channel.

12. The method of claim 11, wherein said second transmission channel comprises a publicly connected telephone network.

13. The method of claim 12, wherein said telephone network is a mobile radio network.

14. The method of claim 2, wherein said second transmission channel comprises a TCP-IP network.

15. The method of claim 2, wherein user identification data are sent over said reverse channel to a billing center and are used by this billing center for billing the reproduced images.

16. The method of claim 2, wherein additional multimedia data requested by said at least one user are sent over said second transmission channel.

17. The method of claim 16, wherein said additional multimedia data correspond to a hyperlink selected with the eye in the reproduced image.

18. The method of claim 2, wherein said viewing direction is determined in advance.

19. The method of claim 18, wherein said viewing direction is predetermined in consideration of the movement of the viewing point.

20. The method of claim 18, wherein said viewing direction is predetermined in consideration of the movement of the viewed object on said image data.

21. The method of claim 18, wherein said viewing direction is predetermined in consideration of marked areas in the image.

22. A communication terminal comprising:

means for determining a current viewing direction of a specific user of said communication terminal;

means for sending said current viewing direction over a reverse channel;

means for receiving first image data over a first transmission channel, said first image data being broadcast to a plurality of users including the specific user;

means for receiving second image data over a second transmission channel, said second image data having a higher resolution than said first image data, wherein said viewing direction is utilized such that said second image data corresponds to a viewed image area currently being viewed by the specific user or predicted of being viewed by the specific user in the future; and image reproducing means for superimposing and simultaneously reproducing said first and said second image data for display to the specific user.

23. The communication terminal of claim 22, wherein said image data are projected by said image reproducing means onto the retina of said user.

24. The communication terminal of claim 23, wherein said image reproducing means are a Virtual Retinal Display that projects image signals corresponding to said image data onto the retina of said user.

25. The communication terminal of claim 23, wherein said currently viewed image area corresponds to the image area that is to be projected onto the fovea of said retina.

26. The communication terminal of claim 25, wherein the size of said currently viewed image area can be adjusted.

27. The communication terminal of claim 22, wherein said image reproducing means are integrated in a different unit from the receiving part of said communication terminal.

28. The communication terminal of claim 27, wherein said components of said terminal are connected over a contactless interface at close range.

29. The communication terminal of claim 22, further comprising a first receiver for image data transmitted in broadcast mode over said first transmission channel.

30. The communication terminal of claim 29, wherein said first receiver is a radio receiver.

31. The communication terminal of claim 30, wherein said first receiver is a DVB radio receiver.

32. The communication terminal of claim 29, wherein said first receiver includes a data carrier reader.

33. The communication terminal of one of the claims 23 to 32 and 22, further comprising a second receiver for image data transmitted over said second transmission channel.

34. The communication terminal of claim 33, wherein said second receiver is a transceiver that can send said viewing direction over said reverse channel.

35. The communication terminal of claim 34, wherein said second receiver is a mobile radio terminal.

36. The communication terminal of claim 22, wherein it sends said viewing direction in real-time over said second transmission channel to the sending device.

37. The communication terminal of claim 22, wherein it includes a cache memory for said second image data.

38. The communication terminal of claim 37, wherein said cache memory contains image data that correspond to a larger area than-the currently viewed image area and wherein the image data that are extracted from said cache memory depend on the current viewing direction.

39. The communication terminal of claim 37, wherein it further includes a first cache memory for said first image data, and wherein the data from said first and from said second cache memories are extracted synchronically.

40. The communication terminal of claim 22, wherein said second image data corresponds to a viewed image area predicted of being viewed by the user in the future.

41. The communication terminal of claim 40, wherein said image reproducing means produces an image having portions at both said low and said higher resolutions.

42. A method for the reproduction of image data by image reproducing means, comprising the steps of:
  determining a current viewing direction of a specific user of said image reproducing means;
  sending said current viewing direction over a reverse channel;
  receiving first image data broadcast over a first transmission channel to a plurality of users including the specific user;
  receiving second image data over a second transmission channel, said second image data having a higher resolution than said first image data, wherein said current viewing direction is utilized such that said second image data corresponds to a viewed image area currently being viewed by the specific user or predicted of being viewed by the specific user in the future; and
  reproducing an image corresponding to said first and said second image data.

43. The method of claim 42, wherein said image is reproduced by superimposing said first image data and said second image data to form a combined image having both low and high resolution portions.

44. A sending device comprising:
  a receiver for receiving data comprising the viewing direction of a specific user transmitted over a reverse channel;
  a first encoding module for compressing a first image data, and for broadcasting said first image data over a first transmission channel in broadcast mode to a plurality of users including the specific user;
  a second encoding module for compressing second image data in a resolution higher than said first image data, said second image data corresponding to a viewed image area currently being viewed by the specific user or predicted of being viewed by the user in the future, said second encoding module also for sending said second image data over a second transmission channel.

45. The device of claim 44, wherein said viewed image area is the image area that is to be projected onto the fovea of said retina.

46. The device of claim 45, wherein the size of said viewed image area can be adjusted.

47. The device of claim 46, wherein the size of said viewed image area can be adapted to the bandwidth of said second transmission channel.

48. The device of claim 44, wherein said first image data are transmitted in broadcast mode over said first transmission channel.

49. The device of claim 44, wherein sound data are transmitted over said first transmission channel simultaneously with said first image data.

50. The device of claim 44, wherein said second transmission channel is bi-directional and wherein said reverse channel is the reverse channel of this second transmission channel.

51. The device of claim 50, wherein said second transmission channel includes a publicly connected telephone network.

52. The device of claim 51, wherein said-telephone network is a mobile radio network.

53. The device of claim 44, wherein a billing center is provided in order to bill to the user the reproduction of the images.

54. The device of claim 44, wherein it includes a segmentation module in order to determine the image areas that are to be forwarded to said second encoding module.

55. The device of claim 44, wherein said second encoding module encodes all at once image data that correspond to at least one image area viewed simultaneously by a plurality of users currently or in future and sends them to said plurality of users.

56. The device of claim 44, wherein said viewing direction is determined in advance.

57. The device of claim 44, wherein said viewing direction is predetermined in consideration of the movement of the viewing point.

58. The device of claims 44, wherein said viewing direction is predetermined ih consideration of the movement of the viewed object on said image data.

59. The device of claim 44, wherein said viewing direction is predetermined in consideration of marked areas in the image.

60. A communication system comprising:
  a communication terminal including:
    means for determining a current viewing direction of a specific user of said communication terminal;
    a reverse transmitter for sending said current viewing direction over a reverse channel;
    a first receiver for receiving first image data broadcast over a first transmission channel;
    a second receiver for receiving second image data over a second transmission channel; and
    image reproducing means for superimposing and simultaneously reproducing said first and said second image data to produce an image having portions at both lower and higher resolutions for display to the specific user;
  and a sending device including:
    means for utilizing said current viewing direction for determining a currently viewed area that is currently being viewed by the specific user;
    means for utilizing said current viewing direction for predicting a future viewing area predicted to be viewed by the specific user in the future;
    a receiver for receiving data comprising the viewing direction of the specific user transmitted over the reverse channel;
    a first encoding module for compressing said first image data at the lower resolution;
    a first transmitter for broadcasting said first image data over said first transmission channel in broadcast mode to a plurality of users including the specific user;
    a second encoding module for compressing said second image data in said higher resolution that is higher than the resolution of said first image data, said second image data corresponding to one or both of said currently viewed area and said future viewing area; and a second transmitter for sending said second image data over said second transmission channel to the specific user.

61. A method for the transmission of image data from a sending device to a communication terminal, comprising the steps of:

providing first image data to the communication terminal;

determining a current viewing direction of a user of the communication terminal;

determining a future viewing area of the user utilizing said current viewing direction; and providing second image data to the communication terminal, said second image data having a higher resolution than said first image data, wherein the future viewing area of the user is utilized such that said second image data corresponds to an image area of the communication terminal predicted as likely being viewed by the user in the future.

* * * * *